United States Patent [19]
Armstrong

[11] 3,939,933
[45] Feb. 24, 1976

[54] TRANSMISSION CONTROL SYSTEM

[75] Inventor: Anthony Clubley Armstrong, Abergavenny, Wales

[73] Assignee: Massey-Ferguson-Perkins Limited, London, England

[22] Filed: Mar. 22, 1973
(Under Rule 47)

[21] Appl. No.: 343,808

[30] Foreign Application Priority Data
Mar. 22, 1972 United Kingdom............ 013447/72

[52] U.S. Cl................................. 180/53 R; 60/347
[51] Int. Cl.² ......................................... F16D 33/04
[58] Field of Search ... 180/66 R, 53 R, 44 M, 77 R, 180/79, 79.2; 60/332, 342, 347, 334

[56] References Cited
UNITED STATES PATENTS

| | | | |
|---|---|---|---|
| 2,611,227 | 9/1952 | Keller................................. | 180/53 R |
| 2,708,800 | 5/1955 | Logus................................. | 180/53 R |
| 3,061,032 | 10/1962 | Ritter, et al....................... | 180/53 R |
| 3,196,972 | 7/1965 | Perrin ............................... | 180/77 R |
| 3,258,081 | 6/1966 | Kugel et al........................ | 180/53 R |
| 3,455,407 | 7/1969 | Phillips ............................. | 60/342 |
| 3,500,633 | 3/1970 | Livezey............................. | 180/66 R |

FOREIGN PATENTS OR APPLICATIONS
910,663   11/1962   United Kingdom

Primary Examiner—Leo Friaglia
Assistant Examiner—Jack D. Rubenstein
Attorney, Agent, or Firm—Thomas P. Lewandowski

[57] ABSTRACT

Control system for a variable performance torque converter on a vehicle which has a number of auxiliary services such as brakes or cylinders served by a power source driven by the vehicle engine includes an actuator operating a control element on the torque converter in response to signalling means connected to the auxiliary services to proportion power from the engine between the torque converter and the power source for the auxiliaries.

11 Claims, 5 Drawing Figures

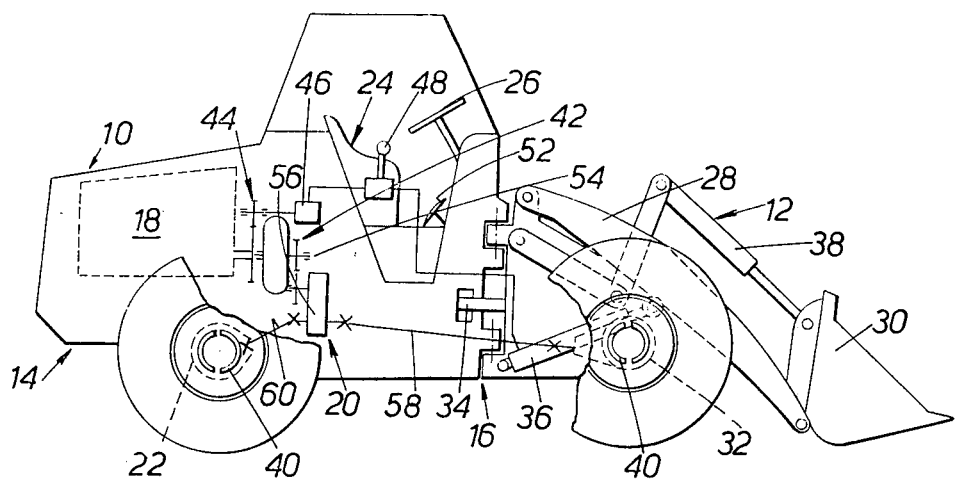
FIG.1.
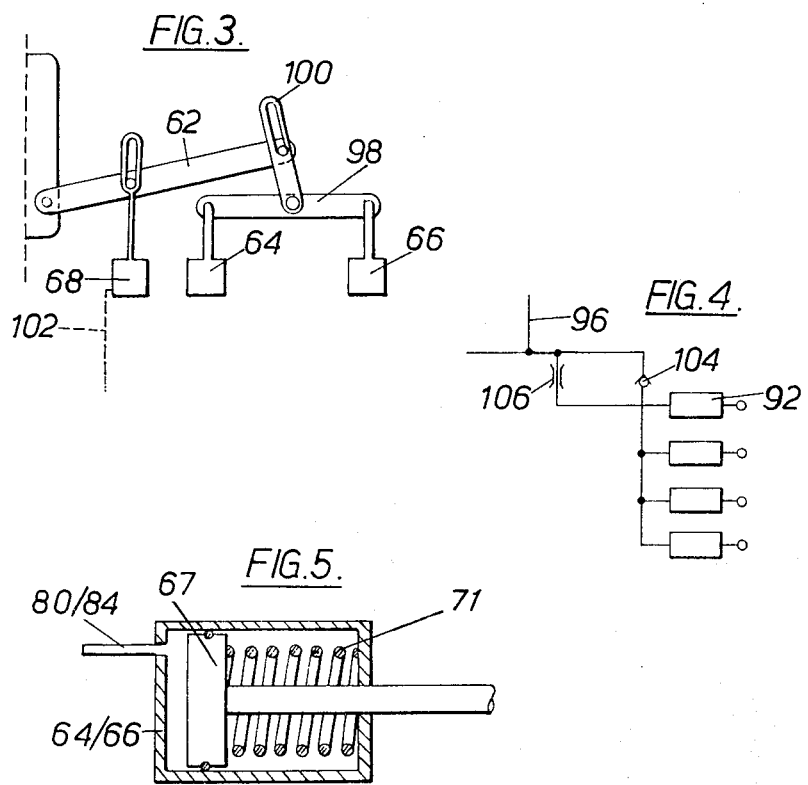
FIG.3.
FIG.4.
FIG.5.

TRANSMISSION CONTROL SYSTEM

This invention relates to improvements in torque converter controls and more particularly to a control system for a torque converter installed in the tractive drive of a vehicle.

Torque converters are known which are provided with impeller, turbine or stator blades which are variable in pitch so that infinitely variable control of the torque output characteristics of the converter can be achieved. It is also known for such torque characteristics to be achieved by controlled filling of the torque converter. Such torque converters will hereinafter be referred to as conventional torque converters. One example of a conventional torque converter is described in British Pat. No. 910,663 in which adjustable stator or reaction blades are provided, the attitude of which is adjustable by means of a manually operable hand-wheel and/or in association with gear changes to change the direction of rotation of the output member.

In industrial vehicles, such as diggers and other earth moving equipment which have a single engine, providing through a tractive drive tractive power for the vehicle and also power to drive the vehicle's auxiliary services, such as power assisted brakes, hydraulic rams and other pneumatic and hydraulic equipment, various disadvantages are encountered when, for economic reasons, it is not possible to provide the vehicle with an engine capable of supplying sufficient power to allow both the vehicle tractive drive and the auxiliary services to operate at their full potential. Furthermore, in such vehicles, when the vehicle is being braked, it is necessary to reduce the tractive power rapidly to zero so that the brakes can act most efficiently. This latter problem has been solved in the past by disconnecting the vehicle tractive drive when a predetermined degree of braking is applied. However, such a system has the disadvantage that when the braking effort is removed there is a time delay before the drive is reestablished, which delay can cause momentary loss of control of the vehicle.

An object of the present invention is to provide control for a torque converter of the kind aforesaid which enables the auxiliary services to act promptly and efficiently at the expense of the vehicle tractive drive while allowing the latter to continue to operate under such remaining power as is left to it.

The present invention provides a control system for a conventional torque converter in which the performance characteristic is adjustable by an actuator in response to a signal received from the auxiliary services, such signal being indicative of the state of the auxiliary services.

The invention also includes a vehicle having an engine adapted to provide tractive drive for the vehicle and to provide drive to the auxiliary services, in which power is transmitted from the engine to the tractive drive through a conventional torque converter and a control element therefor through which the performance is adjustable by the actuator which is operatively connected to it.

In the case of a torque converter having facility for adjusting at least one set of blades the attitude of the stator or reaction blades is adjusted to achieve the required performance. The auxiliary services may include a hydraulic pump adapted to supply pressurized fluid to at least one hydraulically operated device and the actuator is responsive to a change in hydraulic pressure acting on the device, the arrangement being that increases in hydraulic pressure on the device causes adjustment of the blades so as to reduce the power transmission from the engine to the tractive drive of the vehicle and reduction of pressure on the device restores the power to the tractive drive.

The hydraulically operated device may be a hydraulic motor in the form of a ram, vane motor or a hydraulic steering device or the like in which case the power transmission from engine to traction drive is reduced optionally to zero. In the case where the hydraulically operated device is constituted by brakes of the vehicle the power transmission is reduced to zero either by a pressure sufficient to apply the brakes or by a slightly smaller pressure than brake engagement pressure.

Likewise the auxiliary services may include an air compressor adapted to supply compressed air to at least one pneumatically operated device and said actuator is responsive to changes in pneumatic pressure at the device in a manner so as to reduce power transmissions from the engine to the tractive drive of the vehicle in response to an increase in the pneumatic pressure.

The pneumatically operated device may be a vehicle braking device, pneumatic motor, pneumatic ram or the like and the corresponding actuators will operate in a like manner to their hydraulic counterparts.

It can be arranged that mechanical signals originating from the brakes are operative to cause reduction to zero of power to the tractive drive.

The preferred embodiment of the invention will now be described with reference to the accompanying drawings of which:

FIG. 1 is a partially sectioned diagrammatic elevation of a wheeled shovel vehicle;

FIGS. 3 and 4 are modifications of portions of FIG. 2; and

FIG. 5 is a diagrammatic cross section of one actuator in FIG. 2.

Figure 2:
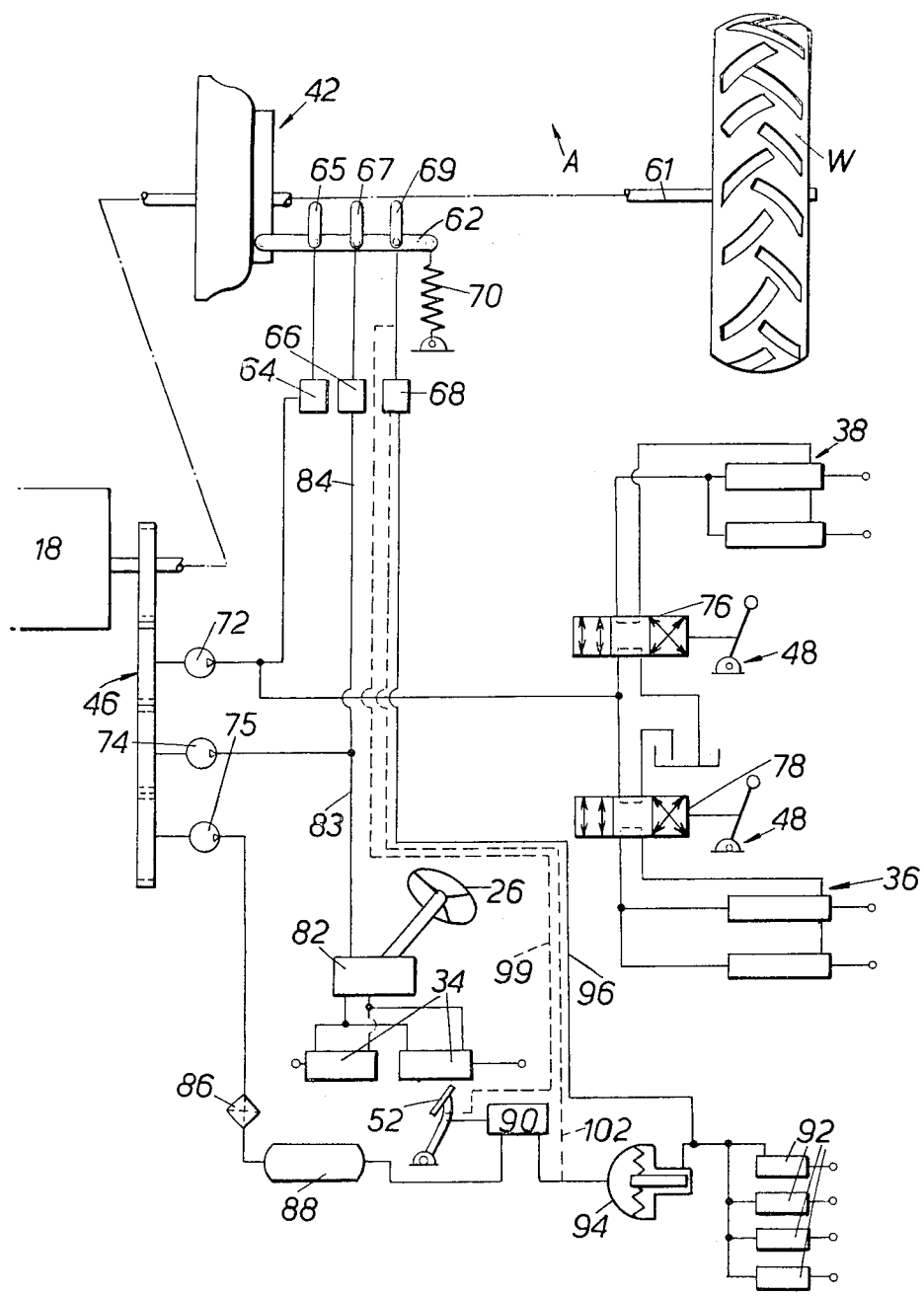
FIG. 2 is a circuit diagram of the tractive drive and control system of the vehicle in FIG. 2.

The wheeled shovel 10 consists of an articulated vehicle having front and rear parts 12 and 14 connected and articulated about a vertical axis 16. The rear part 14 carries the engine 18 and transmission assembly 20 and is supported by a two-wheeled axle assembly 22. The driver's seat 24 and steering wheel 26 are also mounted on the rear part 14. The front part 12 carries a boom 28 pivoted thereon and a bucket 30 pivotally mounted on the front end of the boom 28. A front wheel and axle assembly 32 supports the front part 12. All the drive elements between the engine 18 and the wheels 21 constitute the traction drive.

Steering rams 34 articulate the vehicle for steering purposes. Two boom rams 36 are adapted to elevate and lower the boom 38, and bucket rams 38, are adapted to pivot the bucket 30 on the boom 28. Brakes 40 and the above rams 34, 36 and 38 are all served hydraulically.

The engine 18 drives a hydrokinetic torque converter 42 and, through gearing 44, several hydraulic pumps and compressors identified collectively in FIG. 1 by a box 46. Fluid from the pumps and compressors are controlled by an array of valves under the hand of the operator and identified in FIG. 1 as a valve box 48. These valves control the boom rams 36 and bucket rams 38. The steering wheel 26 controls the steering rams 34, and a separate foot pedal 52 controls the brakes 40.

The output shaft 54 of the torque converter 42 drives through a gearbox 56 and universally jointed shafts 58 and 60 to the front and rear axles respectively. The gearbox 56 may provide several gear ratios and in a vehicle of this kind will provide a quick forward and reverse gearchange facility.

FIG. 2 shows a circuit diagram in which certain of the parts have already been identified. The box 46 and valve box 48 are shown as enclosing a group of pumps and valves respectively.

The torque converter 42 is equipped with a variable angle stator such as can be seen in British Patent No. 910,663 and the control element therefor is shown diagrammatically as a lever 62 in FIG. 2. The lever 62 is moved by one of a series of actuators 64, 66, 68 and is biased by a spring 70 into a position in which the torque converter is adapted to give maximum torque to the traction drive represented diagrammatically by shaft 61 and wheel w in FIG. 2. Movement of the lever 62 in the direction of arrow A adjusts the stator to give less torque conversion and therefore less energy throughput. The actuators 64, 66 and 68 are all equipped with lost motion connections 65, 67 and 69 to lever 62 to enable each one to move the lever without moving the others. Actuators 64, 66 and 68 also constitute detectors of the state of the respective auxiliary services and the movement they impart to the lever 62 is in response to a signal received from signalling means, described below, on the auxiliary services.

Actuators 64 and 66 are spring loaded by springs 71 on pistons 67 as shown in FIG. 5 so that progressive increase in pressure causes progressive compression of the spring 71 and movement of lever 62 in FIG. 2.

Two pumps 72 and 74 and one air compressor 75 identified collectively as box 46 in FIG. 2, are driven by the engine 18. Pump 72 delivers to two valves 76 and 78 of the open center type. These control the bucket rams 38 and boom rams 36 respectively. Actuator 64 is tapped into this pump 72 by line 80.

Pump 74 supplies pressure fluid through line 83 to the steering valve 82 which is controlled by the steering wheel 26. Actuator 66 is tapped into pump 74 by line 84.

Compressor 75 delivers through water trap 86 to tank 88 and on to valve 90 which is controlled by pedal 52. The brake actuators 92 are hydraulically actuated through an air operated master cylinder 94 which is energized under the control of the pedal 52 and valve 90. Signalling means such as an air line 96 can be arranged to connect the brake system with actuator 68. Also a dotted line 99 representing a mechanical connection can be connected from pedal 52 to lost motion connection 69.

In operation, the engine rotates the pumps 72 and 74 and compressor 75 while it is running but the pump delivery is routed to a reservoir 97 through valve box 48 unless brought into use, and the compressor is provided with a cut off as soon as the tank 88 is full. With no hydraulic or braking demand, all the engine 18 power is available for the traction drive, hence the stators of the torque converter 42 are set to the position in which they can make best possible use of the power available which corresponds to the position of lever 62 seen in FIG. 2. This is the situation when the bucket 30 is being filled by being driven into the pile of earth.

When the boom and bucket rams 36 and 38 respectively are brought into service pressure generated at rams 36 and 38 by the pump 72, is sensed by actuator 64 through signalling means such as line 80. The actuator 64 responds to the pressure by moving lever 62 in the direction of arrow A while compressing spring 71, see FIG. 5, thus changing the stator angle and reducing the amount of energy routed through the converter to make it available to the pump 72. The strength of spring 71 is arranged to be such that the increase in power required by the device is matched by the loss of power through the torque converter caused by the appropriate movement of lever 62. This is the situation when all the power needs to be delivered to the rams 36, 38 to tear the bucket 30 free of the earth and lift it to a carrying position.

Articulated vehicles especially need considerable power for turning while they are at a standstill or are moving only slowly so when the steering wheel 26 is turned, pump 74 delivers pressure fluid for this purpose, such pressure being sensed by signalling means such as line 84 and causing actuator 66 to reset lever 62 again to reduce the energy flow through the converter 42 and to make it available to the pump 74. If the vehicle is moving with reasonable speed, no undue fluid pressure is required to steer and actuator 66 does not cause a movement of the lever 62.

Depression of pedal 52 causes the brakes 40 to be applied. Brake application pressure is sensed through line 96 and causes the actuator 68 to act on lever 62 to reduce the power flow through the converter 42 to zero. The purpose of signalling to the converter 42 in this case is not so much to give preference of power flow between two power demands but to ensure that no power flows to the wheels 21 when the brakes 40 are applied. It can be arranged that as the pressure builds up in the brakes 40 the lever 62 is moved to the zero power position just prior to the brakes 40 coming on.

The engine 18 usually used in the vehicle is governed diesel engine.

An alternative form of the invention would involve coupling the actuators 64, 66 and 68, or any two of them, in such a way that the combination of signals received through their signalling means such as lines 80, 84 and 96, as appropriate, has the effect of rotating lever 62 as required. An example of how this could be arranged is by the use of balancing beam 98 as shown in FIG. 3. In this version the power demand by raising the loaded bucket 30 and steering the vehicle at the same time can be signalled to the lever 62 by the balance beam 98 which has a lost motion connecting link 100 connected to the lever 62. The brake pressure responsive actuator 68 is required to move lever 62 on its own because its purpose is to stop power flow through the converter rather than reduce it.

The actuator 68 can be a pneumatic actuator connected to the air brake system by a pneumatic connection illustrated by dotted line 102 in FIGS. 2 and 3. Alternatively, the intention to use brakes can be signalled to lost motion connection 69 by a direct mechanical link for instance if the torque converter 42 happens to be located close alongside the brake pedal 52.

Clearly the use of mechanical or electrical methods or elements to signal the state of the service to the appropriate actuator is encompassed within the invention.

It is also envisaged that a delay be imposed on the release of the brakes in order to allow the torque converter to reestablish traction drive before the brakes are finally disengaged. This is illustrated in FIG. 4 in which there is shown a hydraulic delay circuit comprising a check valve 104 and throttle 106 in parallel. This enables a quick flow of pressure fluid to the brakes through the check valve and a relatively slow release of the brake by outflow through the throttle 106. This enables the pressure in line 96 and actuator 68 to be dropped and consequently the traction drive to be reestablished by resetting lever 62 just prior to final release of the brakes.

The preferred embodiment has been illustrated by reference to three actuators 64, 66, 68. It would be possible to use a single actuator, there being pilot valve arrangements to connect the sole actuator to the service generating the highest pressure.

Alternative circumstances might prevail where an actuator would be required to increase the power delivered through traction drive in response to an increase in pressure on a service. In such a case it would be arranged for the actuator to be spring loaded such that increase of pressure would overcome the spring load and move the lever 62 to the position shown in FIG. 2.

I claim:

1. In a vehicle having an engine, a tractive drive with at least one wheel, a selectively variable torque converter driven by said engine, said torque converter being connected to said driven wheel or wheels said torque converter having a control element for varying the torque of the converter, at least one auxiliary service including a pump directly driven by said engine, the improvement comprising a control system having an actuator operatively connected to and operable on the control element, and a conduit interconnecting said auxiliary service and actuator to position the control element with said actuator upon said conduit transmitting a signal from said auxiliary service to said actuator and thereby proportion the power from the engine between the tractive drive and said auxiliary service.

2. A control system according to claim 1 wherein said auxiliary service includes a fluid pump and at least one fluid pressure operated device, said actuator being responsive to a change in fluid pressure acting on said device.

3. A control system according to claim 1 wherein said actuator includes a spring to ensure progressive movement of the control element with progressive increase in pressure.

4. A control system according to claim 1 wherein said actuator is a hydraulic motor.

5. A control system according to claim 1 wherein said actuator is a pneumatic motor.

6. A control system according to claim 1 including at least one additional actuator and means interconnecting a number of said actuators to act in concert upon the control element.

7. A control system according to claim 6 wherein said means includes at least one balance beam.

8. A control system according to claim 1 wherein said conduit is fluid pressure transmitting.

9. A control system according to claim 8 including means for delaying the signal to said actuator.

10. A control system according to claim 9 wherein said auxiliary service includes hydraulic brakes and said means for delaying includes a throttle in said fluid pressure transmitting conduit supplying said brakes.

11. A control system according to claim 10 including a bypass by a second conduit incorporating a check valve to prevent fluid flowing therethrough away from said brakes.

* * * * *